April 4, 1961 L. H. BROWNE 2,977,974
VALVE
Filed Nov. 4, 1957

INVENTOR.
LINDSAY H. BROWNE
BY
ATTORNEYS

United States Patent Office 2,977,974
Patented Apr. 4, 1961

2,977,974

VALVE

Lindsay H. Browne, Westport, Conn.
(% Scott & Williams Incorporated, Laconia, N.H.)

Filed Nov. 4, 1957, Ser. No. 694,258

9 Claims. (Cl. 137—243)

This invention relates to valves and has particular reference to check valves, though, as will appear hereafter it is also applicable to mechanically or electrically operated valves.

This application is in part a continuation of my application, Serial No. 352,190, filed April 30, 1953, now abandoned.

The general object of the present invention is to provide a valve which may be used for controlling the flow of liquid containing solid materials and which will be particularly effective to provide a tight seal against high pressures of the order of one-thousand pounds per square inch.

A further object of the invention is the provision of a valve which will better withstand pounding incident to seating under high pressure conditions.

Still another object of the invention is to provide a valve in which the movable valve member is not only free to rotate relative to its seat, but is caused to rotate by the flow of liquid passing through the valve when open. The advantage of this is to provide a cleaning action serving to maintain the mating valve surfaces free of accumulated dirt. In addition, the rotation provides for even wear of the valve and seat.

The foregoing objects as well as further objects relating particularly to advantageous matters of construction and operation will become apparent from the following description, read in conjunction with the accompanying drawing, in which.

Figure 1:
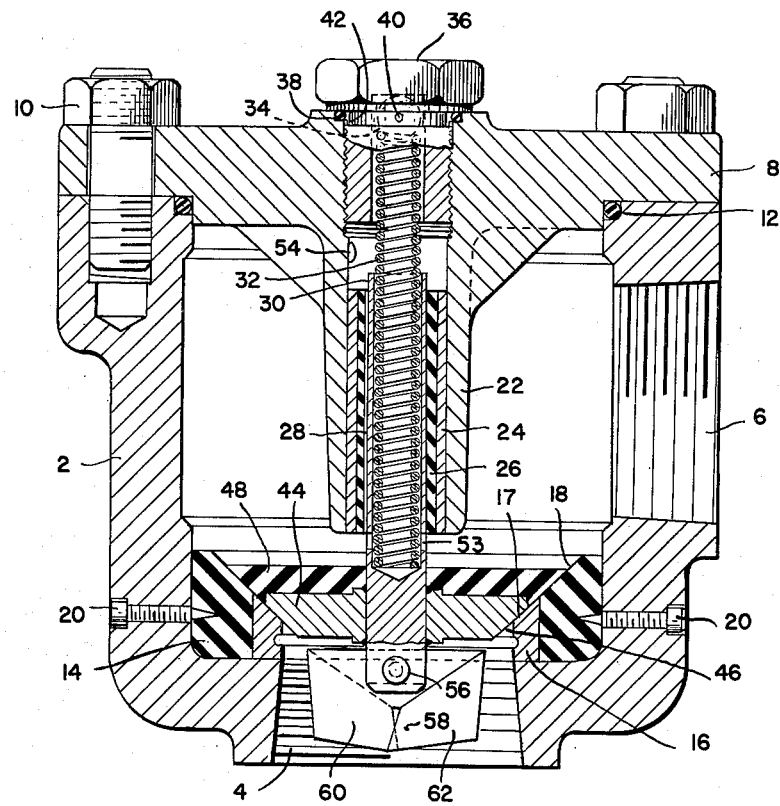
Figure 1 is a transverse section through the improved valve.
Figure 2:
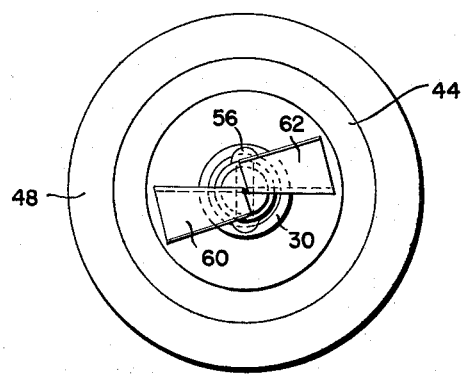
Figure 2 is an inverted plan view of the movable valve member, showing, particularly, the arrangement of vanes for securing rotation of the valve member.

In the following description the term "rubber" will be used in a general sense, not being applied specifically to natural rubber but rather to include natural rubber, artificial rubbers and other materials exhibiting the resiliency characteristics of natural rubber. The choice of the rubber used is dependent primarily upon the materials which are to be handled and their conditions of use. Various synthetic rubbers are desirable where petroleum products are passing through the valve, and the particular rubber used may be chosen from the standpoint of its resistance to corrosion or other deteriorating influences. Whether the rubber is hard or soft depends upon the abrasive or other qualities of solid constituents of the fluids handled. In common with each other, the various rubbers which may be used have the characteristic of substantial flexibility but very little volumetric compressibility. In other words, under applied pressures they may change shape, but undergo little change in volume. These properties are involved in the valve as will appear hereafter.

While the housing for the valve may take various forms, there is shown specifically an assembly suitable for use at very high pressures, and this housing comprises a cup-shaped body 2 provided with openings 4 and 6 which may be tapped for pipe connections or which may alternatively be associated with flanges or the like for other connections. The valve body 2 is arranged to be closed by a cover 8 bolted thereto as indicated at 10 with the interposition of an O-ring seal 12. In the check valve arrangement illustrated normal flow is into the opening 4 and from the opening 6, the valve being automatically opened upon the existence of a pressure gradient to produce such flow.

A seat member of annular form is provided by the elements at 14 and 16 and surrounds the opening 4. The member 14 is formed of rubber and fits at its bottom and periphery a socket provided by the housing. At its upper end the element 14 is provided with an inwardly and upwardly facing conical face 18. For purpose of specific description this may be considered to be a true conical surface. The element 16 is in the form of a ring received within the element 14 and desirably bonded thereto in one of the conventional fashions ordinarily utilized for bonding rubber to metal. The element 16, as well as other metallic elements of the valve assembly, may be formed of a corrosion-resisting metal such as stainless steel, Monel, or the like. From the standpoint of the present invention the property of the ring 16 which is of importance is its substantial rigidity in contrast to the flexibility of the rubber. The upper surface of the ring 16, indicated at 17, is conical and with the same cone angle as the conical surface 18, and the surfaces 17 and 18 merge smoothly, forming parts of the same geometric cone.

To insure that under all conditions of operation the seat member consisting of the elements 14 and 16 remains in position, it may be held locked by screws indicated at 20.

A tubular downwardly extending portion 22 of the cover 8 serves as a mounting for the guide means for the movable valve assembly. Within this there is held by a force fit a metallic sleeve 24 to the inner surface of which there is bonded a rubber sleeve 26, the cylindrical bore of which is desirably provided with a plurality of axially extending grooves 28. A flexible bearing is thus provided for both rotation and angular transverse movements of limited extent of a valve stem 30 which is provided with an extended bore for the reception of the lower end of a valve-closing helical spring 32 the upper end of which extends into an opening in a threaded plug 36 within which opening there is located a spherical ball 34 on which the spring 32 seats. The plug 36 is received in a tapped opening in the cover 8 and a seal is provided by an O-ring 38. One or more transverse bores 40 are provided to furnish communication between the opening in which the ball 34 is located and a groove 42 in the plug beneath its flange portion which engages the O-ring 38.

The arrangement just described provides for freedom of rotation of the stem 30 within the sleeve 26 despite the use of the spring 32 to insure positive closing of the valve. The spring 32 may be relatively weak. By reason of its seating on the ball 34 which, in turn, seats at the upper closed end of the opening in the plug 36, an anti-friction bearing arrangement is provided to minimize restraint on rotation of the valve stem. As will be clear from considering the construction, the spring imposes very little restraint on lateral angular movements of the stem 30, the stem being only resiliently restrained by the sleeve 26.

Figure 3:
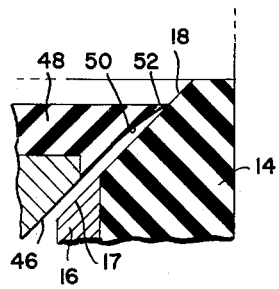
Figure 3 is a fragmentary section illustrating details of construction of the valve member and a seat member.

The valve member comprises the metallic element 44, which may be welded to the stem 30, and the rubber element 48 which surmounts the element 44. The element 44 is provided with a conical surface 46 having the same cone angle as the surface 17 of the element 16. The element 48 has approximately a cone surface 50 forming a continuation of the surface 17. However, the surface 50 is desirably not a direct conical continuation of the surface 17, but rather, as indicated in Figure 3, the surface 50 is divergent from the cone surface 17 and, for example, this divergence may be provided by way of a surface which in axial cross-section takes the form of an arc of a circle tangent to the surface 17 at the point where the elements 44 and 48 meet at their peripheries. The result is that the cone angle at the maximum radius of the element 48 is less than the cone angle of the surface 17 as will be evident from Figure 3. Instead of providing a gradual change of cone angle, however, the angle of the approximately conical surface 50 may be slightly greater than that of the surface 17 from the point of junction of the surfaces. It is desirable that the approximately conical surface 50 should meet the upper surface of the element 48 in a sharp or feather end as indicated at 52.

As an alternative arrangement, the surfaces 46 and 50 may be made continuous with the same cone angle and under such conditions the surface 18 of the element 14 may be provided with a smaller cone angle than that of the surface 17. Here, again, the variation in cone angle may be gradual by an arcuate arrangement, though the surfaces 17 and 18 should be smoothly continuous at their junction. The results of the arrangements described will be apparent from the later description of operation.

The stem 30 has openings 53 extending from its bore to its exterior above the valve element 48, and the extension 22 has openings 54 extending from its bore to its exterior. These openings provide for flow of liquid through the grooves 28 in the member 26.

A pin 56 mounts in the lower end of stem 30 a blade 58 which has angularly diverted vanes 60 and 62 so deflected out of an axial plane that by impingement of flowing liquid rotation of the stem 30 and the valve member carried thereby will be produced. The rate of this rotation depends upon the rate of flow, but it need not be high, its sole purpose being to tend, as the valve seats, to cause the mating surfaces to wipe from each other any solid particles which may have accumulated thereon. New portions of the mating surfaces are also continuously being presented to each other so as to provide evenness of wear.

The operation of the valve may now be described as follows:

When the valve is open, the movable assembly comprising the elements 44 and 48 will normally be in a position above that illustrated in Figure 3 with the edge 52 clearing the surface 18. As the valve starts to close, the edge 52 first engages the conical surface 18 and then, as closure continues, flexing of the periphery of the element 48 takes place, bringing more and more of the approximately conical surface 50 into engagement with the conical surface 18. Closure is completed when the metallic conical surface 46 of element 44 engages the conical surface 17 of the metal cylinder 16. The members 48 and 14 both being flexible, it will be evident that some distortion of each occurs with the resulting tight closure between the surfaces 50 and 18 as they distort. The limiting action resulting from engagement of the metallic members 16 and 44 limits the degree of distortion of the rubber elements.

Rubber is distortable but not compressible, and the fact that the rubber member 14 is confined between inner and outer cylindrical surfaces of the metallic member 16 and the housing 2, respectively, prevents any substantial distortion except local distortion at the conical surfaces. The member 48, furthermore, is so shaped that when closed it is subjected to pressure at its upper surface and engages the surface 18 of member 14 with the result that, irrespective of very high pressure above the valve member, the flexible rubber members will finally assume the positions essentially as illustrated in Figure 1. As a result, the valve is effective to provide closure against pressures in excess of one-thousand pounds per square inch. The conical surfaces of the rubber elements undergo local distortion to the extent required to provide a tight fit over substantially the entire area of contact.

Despite the tight closure, the valve is ready to open when the pressure at the inlet 4 sufficiently exceeds the pressure at the outlet 6. As already noted, the spring 32 may be relatively weak, having a strength sufficient merely to overcome any expected friction so as to insure closure of the valve when its checking action should occur. Substantial excess pressure, however, is, of course, necessary because of the greater area exposed to the outlet pressure as compared with the area exposed to the inlet pressure. As soon, however, as the valve opens, it will open freely except to the extent to which opening is resisted by the weight of the movable assembly and the force of the spring 32. The valve is particularly adapted to the handling of liquids carrying fine solid materials such as slurry carrying abrasives. Any solid material which at the time of closing occurs between the members 48 and 14 is readily trapped, these members being sufficiently flexible to surround solid particles and to seat properly despite their presence. If abrasive slurries are flowing past the valve, the members 44 and 16, as well as the other metallic parts exposed to the abrasive may be formed of hardened materials. The rubber elements are highly resistent to abrasion. Consequently, the valve has a long life.

While the member 14 is not subject to any large degress of distortion, its resilience serves to prevent damage due to pounding under high pressure conditions. Such pounding is inevitable upon closing, but damage is minimized if, when closed, the valve and seat member are accurately concentric. The resilience of member 14 permits slight movements of the metallic seat member 16 so that the latter may be accurately positioned by the valve during seating to provide the desirable concentric fit, this action being further augmented by the flexible mounting of the stem 30 within the rubber member 26. Pounding out of the seat at one location by the valve is thus avoided, and the rotation of the valve member due to flow, as described above, further prevents any local deterioration due to pounding.

While the specific description above has been with particular reference to check valves, it will be evident that the stem 30 may be extended upwardly or downwardly as desired for mechanical or electromagnetic operation. The valve, accordingly is of very general adaptability either as a check valve or as a power-operated valve. The valve is, for example, particularly useful in high pressure pumps.

It will be evident that variations may be made in details of construction without departing from the invention as defined in the following claims.

What is claimed is:

1. A valve comprising a housing having an inlet opening and an outlet opening, an annular seat member extending about said inlet opening, a valve member substantially coaxial with said seat member, and means for guiding said valve member for axial movement towards and away from said seat member, said seat member comprising an outer annular resilient rubber seat element and an inner annular rigid seat element bounded by said rubber seat element and free to move transversely to its axis except as restrained by said rubber seat element, said seat elements having substantially conical inwardly directed seating faces, the face of one being substantially continuous with that of the other, said valve member comprising a resilient rubber valve element and a rigid valve element, the rubber valve element providing an approximately conical outwardly directed face and the rigid valve element providing a substantially conical outwardly directed face interiorly of the conical face provided by said rubber valve element and substantially continuous therewith, the conical faces of the seat member and of the valve member being dimensioned and facing each other so that when valve closure occurs the faces of the rubber elements engage each other and the faces of the rigid elements engage each other, said guiding means mounting said valve member for limited lateral movement relative to the housing and the conical faces of said rigid elements having substantially the same cone angles so that as the conical faces of said members engage each other the members are axially aligned by mutual engagement of the conical faces of said rigid elements.

2. A valve head and seat construction comprising an annular seat member defining an opening, a valve head member substantially coaxial with said seat member, and means for guiding said valve head member for axial movement towards and away from said seat member, said seat member comprising an outer annular resilient rubber seat element and an inner annular rigid seat element bounded by said rubber seat element and free to move transversely to its axis except as restrained by said rubber seat element, said seat elements having substantially conical inwardly directed seating faces, the face of one being substantially continuous with that of the other, said valve head member comprising a resilient rubber valve element and a rigid valve element, the rubber valve element providing an approximately conical outwardly directed face and the rigid valve element providing a substantially conical outwardly directed face interiorly of the conical face provided by said rubber valve element and substantially continuous therewith, the conical faces of the seat member and of the valve head member being dimensioned and facing each other so that when valve closure occurs the faces of the rubber elements engage each other and the faces of the rigid elements engage each other, said guiding means mounting said valve head member for limited lateral movement and the conical faces of said rigid elements having substantially the same cone angles so that as the conical faces of said members engage each other the members are axially aligned by mutual engagement of the conical faces of said rigid elements.

3. A valve according to claim 2 in which the cone angle at at least the outer portion of the approximately conical face of the rubber valve element is greater than that of the rubber seat element at their region of engagement, so that as valve closure occurs their mutual engagement is progressive inwardly.

4. A valve according to claim 3 in which the outer portion of the approximately conical face of the rubber valve element terminates in a sharp edge.

5. A valve according to claim 2 in which the cone angle at at least the outer portion of the approximately conical face of the rubber valve element is different from that of the rubber seat element at their region of engagement, said faces converging outwardly at their region of engagement, so that as valve closure occurs their mutual engagement is progressive inwardly.

6. A valve according to claim 5 in which the outer portion of the approximately conical face of the rubber valve element terminates in a sharp edge.

7. A valve according to claim 2 in which the valve head member is provided with a stem and in which the guiding means comprises a resilient sleeve surrounding said stem and provided with interior axially extending grooves.

8. A valve according to claim 2 in which the valve head member is provided with at least one vane arranged to rotate the valve member due to impingement of flowing fluid thereon.

9. A valve according to claim 8 provided with a spring for urging said valve member towards closed position, and a ball providing a seat for said spring at at least one end thereof to provide for free rotation of said valve member when it is in its open position.

References Cited in the file of this patent

UNITED STATES PATENTS

| | | |
|---|---|---|
| 1,484,997 | Rossiter | Feb. 26, 1924 |
| 1,861,420 | Mahan | May 31, 1932 |
| 1,882,433 | MacClatchie | Oct. 11, 1932 |
| 1,966,264 | Roye | July 10, 1934 |
| 2,163,472 | Shimer | June 20, 1939 |
| 2,229,823 | Sharp | Jan. 28, 1941 |
| 2,329,576 | Anderson | Sept. 14, 1943 |
| 2,372,629 | Nelson | Mar. 27, 1945 |
| 2,483,572 | Carter | Oct. 4, 1949 |
| 2,495,880 | Volpin | Jan. 31, 1950 |
| 2,739,607 | Murray | Mar. 27, 1956 |
| 2,745,631 | Shellman | May 15, 1956 |
| 2,898,082 | Almen | Aug. 4, 1959 |
| 2,918,078 | Cummings | Dec. 22, 1959 |

FOREIGN PATENTS

| | | |
|---|---|---|
| 379,258 | France | Sept. 4, 1907 |